(12) United States Patent
Hehn et al.

(10) Patent No.: US 10,652,712 B2
(45) Date of Patent: May 12, 2020

(54) METHOD FOR ORGANIZING THE COMMUNICATION BETWEEN MOBILE RADIO NETWORK SUBSCRIBER STATIONS IN A MOBILE RADIO CELL, MOBILE RADIO NETWORK SUBSCRIBER STATION, AND MOBILE RADIO NETWORK MANAGEMENT UNIT

(71) Applicant: VOLKSWAGEN AG, Wolfsburg (DE)

(72) Inventors: Thorsten Hehn, Wolfsburg (DE); Ernst Zielinski, Bochum (DE); Steffen Schmitz, Wesel (DE); Andreas Kwoczek, Lehre (DE); Teodor Buburuzan, Braunschweig (DE); Roman Alieiev, Stendal (DE)

(73) Assignee: VOLKSWAGEN AG (DE)

( * ) Notice: Subject to any disclaimer, the term of this patent is extended or adjusted under 35 U.S.C. 154(b) by 36 days.

(21) Appl. No.: 15/836,999

(22) Filed: Dec. 11, 2017

(65) Prior Publication Data
US 2018/0184272 A1    Jun. 28, 2018

(30) Foreign Application Priority Data

Dec. 22, 2016  (DE) .................. 10 2016 225 977
Mar. 9, 2017   (DE) .................. 10 2017 203 905

(51) Int. Cl.
| | |
|---|---|
| *H04W 4/46* | (2018.01) |
| *H04W 24/02* | (2009.01) |
| *H04W 16/10* | (2009.01) |
| *H04W 4/40* | (2018.01) |
| *H04B 17/318* | (2015.01) |
| *H04W 24/08* | (2009.01) |
| *H04B 17/391* | (2015.01) |
| *H04W 16/28* | (2009.01) |

(52) U.S. Cl.
CPC ............ *H04W 4/46* (2018.02); *H04B 17/318* (2015.01); *H04W 4/40* (2018.02); *H04W 16/10* (2013.01); *H04W 24/02* (2013.01); *H04W 24/08* (2013.01); *H04B 17/391* (2015.01); *H04W 16/28* (2013.01)

(58) Field of Classification Search
None
See application file for complete search history.

(56) References Cited

U.S. PATENT DOCUMENTS

| | | | | |
|---|---|---|---|---|
| 9,055,478 | B2 * | 6/2015 | Goldhamer | ........... H04W 24/10 |
| 9,374,783 | B2 * | 6/2016 | Heo | ........... H04W 52/54 |

(Continued)

FOREIGN PATENT DOCUMENTS

| | | |
|---|---|---|
| CN | 102111779 A | 6/2011 |
| CN | 102970686 A | 3/2013 |

(Continued)

*Primary Examiner* — Kevin D Mew
(74) *Attorney, Agent, or Firm* — Barnes & Thornburg LLP (57) ABSTRACT

A method for organizing the communication between mobile radio network subscriber stations in a mobile radio cell, wherein a mobile radio network management unit, especially the scheduler of a base station, in the mobile radio cell performs the allocation of the radio resources. The mobile radio network management unit defines for the mobile radio cell a number of subradio areas in which a number of mobile radio subscriber stations are allowed to use the same radio resources for direct communication with one another in parallel operation.

13 Claims, 4 Drawing Sheets

(56) References Cited

U.S. PATENT DOCUMENTS

| | | |
|---|---|---|
| 10,231,234 B2 * | 3/2019 | Noh ................... H04B 17/345 |
| 2013/0150058 A1 | 6/2013 | Lim et al. |
| 2013/0170387 A1 * | 7/2013 | Wang ..................... H04W 4/70 370/252 |
| 2013/0322388 A1 | 12/2013 | Ahn et al. |
| 2014/0003262 A1 * | 1/2014 | He ......................... H04W 4/70 370/252 |
| 2014/0066113 A1 * | 3/2014 | Zhuang ................. H04B 7/026 455/501 |
| 2014/0254401 A1 | 9/2014 | Talwar et al. |
| 2014/0321314 A1 * | 10/2014 | Fodor ................ H04W 72/085 370/252 |
| 2015/0195824 A1 * | 7/2015 | Choi .................... H04L 5/0053 370/236 |
| 2015/0230250 A1 | 8/2015 | Kim et al. |
| 2015/0237616 A1 * | 8/2015 | Morita ................. H04W 76/14 455/522 |
| 2015/0341773 A1 * | 11/2015 | Ribeiro ................ H04W 8/005 370/329 |
| 2015/0373730 A1 * | 12/2015 | Fujishiro .............. H04L 1/0003 455/450 |
| 2016/0014825 A1 * | 1/2016 | Kim ..................... H04W 76/14 370/329 |
| 2016/0037569 A1 * | 2/2016 | Kim ..................... H04W 76/14 455/450 |
| 2016/0095144 A1 * | 3/2016 | Lindoff ................ H04W 24/08 370/329 |
| 2016/0127881 A1 * | 5/2016 | Kim ..................... H04L 5/0032 370/328 |
| 2016/0205534 A1 * | 7/2016 | Fujishiro ............ H04W 72/048 455/434 |
| 2016/0219499 A1 * | 7/2016 | Fukuta ................. H04W 76/14 |
| 2016/0227496 A1 * | 8/2016 | Panteleev ........ H04W 74/0833 |
| 2016/0234855 A1 * | 8/2016 | Panteleev ............. H04W 28/08 |
| 2016/0309355 A1 * | 10/2016 | Seo ........................ H04W 8/005 |
| 2016/0316487 A1 * | 10/2016 | Kalhan ............. H04W 72/1278 |
| 2016/0323922 A1 * | 11/2016 | Park ..................... H04W 24/10 |
| 2016/0374105 A1 * | 12/2016 | Kalhan ............. H04W 72/1278 |
| 2016/0381630 A1 * | 12/2016 | Krishnamoorthy ... H04W 76/14 370/329 |
| 2017/0245166 A1 * | 8/2017 | Bienas ................. H04W 24/08 |
| 2018/0098299 A1 * | 4/2018 | Chae ........................ H04J 11/00 |
| 2018/0146466 A1 * | 5/2018 | Shen ..................... H04W 76/14 |
| 2018/0146500 A1 | 5/2018 | Muraoka et al. |

FOREIGN PATENT DOCUMENTS

| | | |
|---|---|---|
| CN | 103220724 A | 7/2013 |
| CN | 103260244 A | 8/2013 |
| CN | 103906247 A | 7/2014 |
| JP | 2011191814 A | 9/2011 |
| JP | 2015508598 A | 3/2015 |
| KR | 20160127029 A | 11/2016 |
| WO | 2010125427 A1 | 11/2010 |
| WO | 2016146880 A1 | 9/2016 |
| WO | 2016194279 A1 | 4/2018 |

* cited by examiner

METHOD FOR ORGANIZING THE COMMUNICATION BETWEEN MOBILE RADIO NETWORK SUBSCRIBER STATIONS IN A MOBILE RADIO CELL, MOBILE RADIO NETWORK SUBSCRIBER STATION, AND MOBILE RADIO NETWORK MANAGEMENT UNIT

PRIORITY CLAIM

This patent application claims priority to German Patent Application Nos. 10 2016 225 977.6, filed 22 Dec. 2016, and 10 2017 203 905.1, filed 9 Mar. 2017, the disclosures of which are incorporated herein by reference in their entireties.

SUMMARY

For the scenario of vehicles equipped with radio communication modules which communicate directly with one another in public road traffic, either for cooperative driving or autonomous driving, a high reliability for safety-critical applications is very important. Technologies for the direct vehicle-to-vehicle communication have already been developed and are being developed further. As an example, the direct vehicle communication via WLAN is mentioned, in this case according to the WLAN standard IEEE 802.11p. In this technology, ad hoc WLAN networks are built up for communication between the vehicles (communication in the area of the "ad hoc domain").

But vehicle communication is also possible in the area of the mobile radio networks. In this technology, it is the base station which has to transfer the messages from vehicle to vehicle. This is the area where the communication takes place in the so-called "infrastructure domain". For the coming mobile radio generation, the direct vehicle communication is also provided for. In the case of LTE corresponding to Long Term Evolution, this is called LTE-V and in the 5G initiative, this is called eV2X.

BRIEF DESCRIPTION OF THE DRAWINGS

Disclosed embodiments are described in more detail with reference to the drawings, in which.

DETAILED DESCRIPTION

Typical communication scenarios are safety scenarios, traffic efficiency scenarios and infotainment. For the safety area, the following scenarios are mentioned: "Cooperative Forward Collision Warning", "Pre-Crash Sensing/Warning", "Hazardous Location Warning". In these areas, the vehicles exchange information with each other about position, direction and speed, also parameters such as size and weight. Further information which is transmitted relates to information on intention such as vehicle intends to pass, vehicle is turning left/right etc. which are of interest for cooperative driving. In this context, sensor data are frequently conveyed. If a hazard situation is present and the driver is not responding, the car could brake automatically so that an accident is prevented or at least the consequences during the unavoidable accident are kept as low as possible.

The vehicle-to-vehicle communication is often also called car-to-car communication (C2C). In English, the designation of vehicle-to-vehicle communication (V2V) is commonly used. This is meant to be the direct exchange of information between moving vehicles. Using this mobile communication, operable radio networks and new applications can be implemented. This includes timely information about road and traffic conditions such as information about the road condition, black ice, aquaplaning, accidents or stopped vehicles. In this safety-related application, the corresponding road user sends the reference to the location of the hazard with the data from the navigation system.

Further information relating to the traffic flow is information about traffic light sequences, stop-and-go runs or continual starting and stopping at roadworks etc. The search for a parking space or information about free parking space capacities can also be included in such vehicle-to-vehicle communication. Furthermore, intelligent driving in convoy is mentioned as an application which is known in English by the term "platooning". In this context, the distances between the vehicles of the queue, e.g., trucks, are adapted to the respective traffic situation and controlled. The aim is to reduce the distance between the vehicles in the convoy as much as possible to reduce the energy consumption. For this purpose, messages must be exchanged continuously between the vehicles in the queue.

Often, standardized messages are exchanged over the air interface between the vehicles. The messages about the current traffic situation are managed in so-called ITS (Intelligent Transport System) stations and transmitted cyclically or event-controlled. There are the Cooperative Awareness Message (CAM), the Decentralized Environmental Notification Message (DENM), Signal Phase and Time message (SPaT) and the Topology Specification message (TO-PO).

The radio messages sent out by a vehicle contain the vehicle position determined by GPS system plus time and speed information. In addition, the area in which other vehicles have to be warned is specified matching the traffic situation and the event is transmitted coded.

The listing shows that time-critical data transmissions take place in the safety area. The reliability of the vehicle-to-vehicle communication is therefore of decisive significance.

In mobile radio, reliability of the data transmission means completeness (all useful data transmitted arrive at the receiver) and correctness (the useful data transmitted and the useful data recovered from the received data agree with one another). For this purpose, various methods are used in the mobile radio technologies, e.g., frequency diversity, spatial diversity, meaningful choice of type of modulation and modulation parameters and of the channel code to be used such as also the code rate etc.

The communication in a mobile radio cell between the mobile radio subscriber stations (UEs—User Equipments but also between UE and network) is controlled and performed via the base station (BS).

For this communication, a limited number of transmission resources is available to the network operator. Since the modern mobile radio systems such as Long Term Evolution LTE use both frequency and time multiplexing technologies, the magnitude of the transmission resource can be specified as a frequency-per-time-unit (FpT). In the text which follows, the transmission resource is also called the radio channel resource or radio resource. If there is no free FpT unit available, the network operator must refuse the fulfillment of the requested service, for example, via the base station. On the one hand, this leads to the reduction of the guaranteed quality of service (QoS) on the side of the customer or, on the other hand, to the reduction of revenues or increase of the costs on the side of the network operator.

To keep the costs for the communication process as low as possible, the radio resources (frequency-per-time-units) must be used or managed efficiently/optimally. The management unit responsible for the management of the radio resources is the "scheduler", located at the base station. This scheduler provides the most optimum possible utilization of the FpT units, i.e., decides how many FpT units may be used by the UEs and when. For a decision, the scheduler uses information or the knowledge about the status of the radio cell with reference to the communication, e.g., the number of UEs having a communication requirement, characteristics of the radio link (quality of reception and UE capabilities), service requirement for the desired communication, customer data etc.

From US 2014/0254401 A1, a technology for specifying transmitting powers in D2D direct communications is known in which each D2D transmitter learns the interference level caused by it during its transmissions at the base station eNodeB.

From US 2015/0230250 A1, it is known to allocate radio resources for a mobile radio communication to a D2D communication within a mobile radio cell and to allocate the rest of these radio resources to another communication within the mobile radio cell.

From WO 2010/125427 A1, a method is known which comprises receiving of an expected interference level for a block of resources, the expected interference level being represented by data which represent an interference which is associated with the block of resources, namely due to D2D communication by using the block of resources.

In the context of the disclosed embodiments, it has been recognized that the existing solutions do not efficiently utilize the radio resources since in the management of these radio resources, the possibilities and radio characteristics of equipment classes (such as vehicles equipped with radio technology) and the possibilities and characteristics of the scenario of utilization (location, development etc.) are not taken into consideration.

One possibility of utilizing the radio resources more efficiently is offered by the device-to-device (D2D) communication. This is of interest especially for the vehicle-to-vehicle communication (V2V). This technology offers direction communication between UEs which are located within a short distance from one another. Communication via the base station (which may need inter alia a high bandwidth or number of radio resources) thus becomes unnecessary.

Disclosed embodiments relate to a method for organizing the communication between mobile radio network subscriber stations in a mobile radio cell, wherein a mobile radio network management unit, particularly the scheduler of a base station, in the mobile radio cell carries out the allocation of the radio resources. The method is characterized in that the mobile radio network management unit defines for the mobile radio cell a number of subradio areas in which a number of mobile radio subscriber stations are allowed to use the same radio resources for direct communication with one another in parallel operation.

A measure relates to specifying the subradio areas in the area of urban development with the aid of map data in such a manner that they correspond to geographic areas which are shielded locally by the development or planting. In this context, the geographic areas can correspond to individual street routes in a simple case.

Furthermore, it is beneficial if, for the determination subradio areas, the subscriber stations are identified which can be disturbed by the parallel operation of other subscriber stations which perform a direction communication.

These identified subscriber stations are allocated by the mobile radio network management unit a specific measurement interval in which the subscriber stations identified perform measurements whilst the subscriber stations which are tested for the parallel operation send out a corresponding uplink test signal. By this, the precise conditions can be determined at the potentially disturbed subscriber stations.

In this context, other subscribers like other subscriber stations, relay stations, IoT stations (Internet of Things) and/or parking vehicles can be included in the measuring procedure for improving the estimation of the subradio areas.

In this context, it is beneficial if the measurements relate to measurements of the received signal strength or of the interference power of the uplink test signal.

For the definition of the subradio areas, it is furthermore beneficial if the subscriber stations which are planning a direction communication convey their information with respect to the direct communication, particularly with regard to type of service, quality of service and/or their radio characteristics, to the base station so that these can be taken into consideration there along with the measurement results.

Further information which is beneficial for specifying subradio areas relate to the information about the radio characteristics of the interferer, especially to the position, the transmitting power, the type of antenna and/or the type of operation used.

One area of use of direct communication in which the measures can be used relates to the direct vehicle communication between two vehicles.

It is very beneficial if an antenna technology with beam alignment possibility is used for the direct vehicle communication which is also designated as "beamforming technology", wherein the vehicles which perform the direct vehicle communication convey the information with respect to the setting of the beam alignment to the base station.

In this context, it is beneficial if lookup tables are used for the information with respect to the setting of the beam alignment and during the transmission of the information with respect to the setting of the beam alignment, an index value for the corresponding entry in the lookup table is transmitted. By this, the amount of data which have to be transmitted for this purpose can be reduced. The lookup tables should be known for this purpose both in the base stations and in the vehicles.

Disclosed embodiments also relate to a correspondingly adapted mobile radio network subscriber station and a correspondingly adapted mobile radio network management unit for the use in the disclosed method.

The scheduler in the mobile radio network management unit utilizes the information about the "subradio areas" specified, which enable undisturbed communication in parallel operation and informs the subscriber stations about the radio resources correspondingly. The scheduler releases the radio resources and parameterizes/checks the subscriber stations, for example, with respect to the beamforming settings to be used, setting of the transmitting power etc.

The present description illustrates the principles of the disclosure. It is thus understood that experts will be able to design various arrangements which, although not described explicitly here, embody principles of the disclosure and are also to be protected in their extent.

Figure 1:
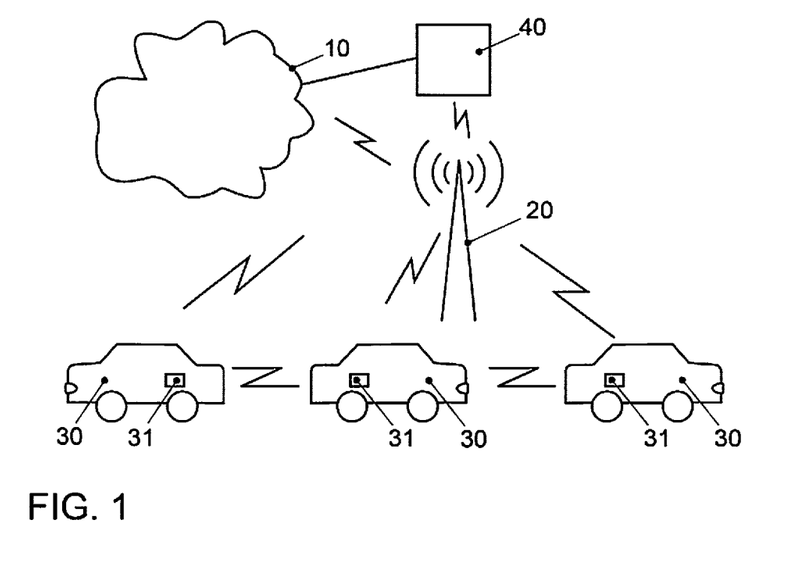
FIG. 1 shows the principle of vehicle communication via mobile radio.

FIG. 1 shows the principle of vehicle communication by a mobile radio. The vehicles are provided with reference number 30. They are in each case equipped with a radio communication module 31 which is also called on-board unit. The on-board unit is used as transmitting and receiving station for the mobile communication. All messages from the vehicles (uplink) and to the vehicles (downlink) are conducted either via a base station which serves a mobile radio cell or, in the case of direct vehicle communication (sidelink) are exchanged directly between the vehicles. If the vehicles are located within this mobile radio cell, they are registered or booked in the base station 20 (called eNodeB in the language used by LTE). If they are leaving the mobile radio cell, they are handed over to the neighbor cell and correspondingly deregistered or booked out at the base station 20. The base station 20 also provides access to the Internet 10 so that the vehicles 30 and/or all other mobile radio subscribers in the mobile radio cell, respectively, are supplied with Internet data. For this purpose, the base station 20 is connected via the so-called Si interface to the EPC 40 (Evolved Packet Core).

For the communication between the base station 20 and an individual subscriber station and also between individual subscriber stations, a limited number of frequency-per-time-resource units are available to the network operator. If there is no free FpT resource unit, the network operator or the base station 20, respectively, has to refuse fulfillment of the requested service. On the one hand, this leads to the reduction of the guaranteed quality of service (QoS) on the side of the customer or, on the other hand, to the reduction of revenues or increase in the costs on the side of the network operator. To keep the costs for the communication process as low as possible, the radio resources must be used or managed efficiently. This is the task of the scheduler and he should provide the most optimum possible utilization of the FpT resource units, i.e., he decides which UEs are allowed to use how many FpT resource units when. For the decision, the scheduler utilizes the information or the knowledge about the status of the cells referred to the communication such as, e.g., number of subscriber stations UE with communication requirement, characteristics of the radio link (quality of reception and UE possibilities), the type of service requirement of the required communication, customer data etc.

One possibility of utilizing the radio resources more efficiently is offered by the device-to-device (D2D) communication. This technology offers direct communication between subscriber stations UE which are located at a short distance from one another (in the sidelink transmission direction). Thus, these data do not have to be transmitted to or from the base station 20 in the uplink or downlink direction. This may release a high bandwidth or number of radio resources. It then becomes possible for the D2D communication to carry out this communication at the same time in the same frequency range in the same resource block as the communication which is carried out via the base station 20 to another subscriber station. I.e., the FpT resource unit is used several times at the same time. This is called "frequency reuse" in English. In this context, the increase in efficiency is by far greater than specified quantitatively by the reuse factor. The reason lies in the fact that the communication via the base station 20 is in most cases based on significantly worse channel conditions than in the D2D case. This leads to a higher consumption of resource blocks.

Figure 2:
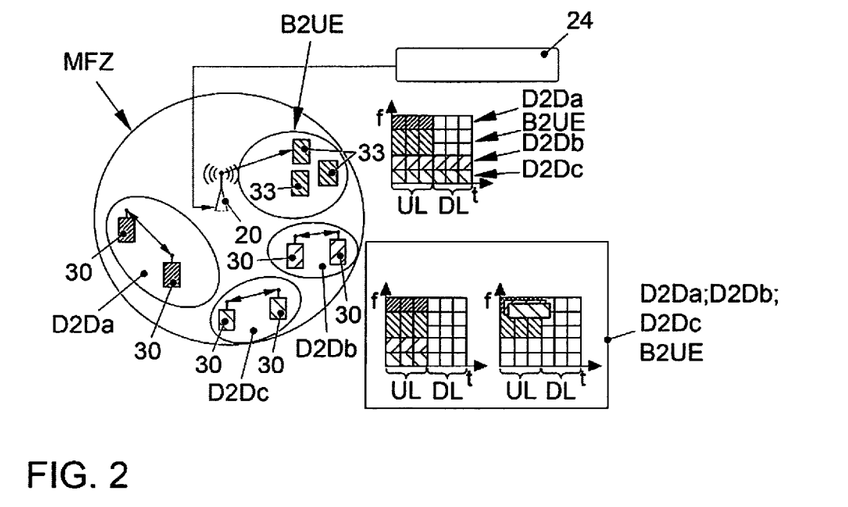
FIG. 2 shows a representation of a radio cell in combination with a representation of the efficient management of radio resources.

FIG. 2 shows on the left-hand side: a simplified view of a mobile radio cell MFZ with conventional mobile radio subscribers 33 in the B2UE area and mobile radio subscribers 30 who perform D2D communication in pairs. D2D communications D2 Da, D2Db and D2Dc are emphasized especially. The D2D communication and the B2UE communication in the mobile radio cell MFZ is controlled and performed via the base station 20. In this context, it is also said that the base station 20 is orchestrating the communications.

The scheduler who is responsible for the resource management is located at the base station 20 and provided with the reference number 24. On the right-hand side of FIG. 2, the efficient management of radio resources is shown. The resource blocks are shown here as squares. The resource blocks for the individual communications are also specified in the right-hand part of FIG. 2. The resource blocks are shown separately for the uplink direction of communication and for the downlink direction of communication. It is to be noted here that for the D2D communication, which is actually separately called sidelink communication, the resource blocks from the uplink area are also used. In the separately emphasized box, the example is shown on the left-hand side that no frequency reuse is used both for the B2UE communication and for the D2D communication. In the right-hand part of the box, it is shown that the frequency reuse technology is used for the D2D communication but not for the B2UE communication.

Figure 3:
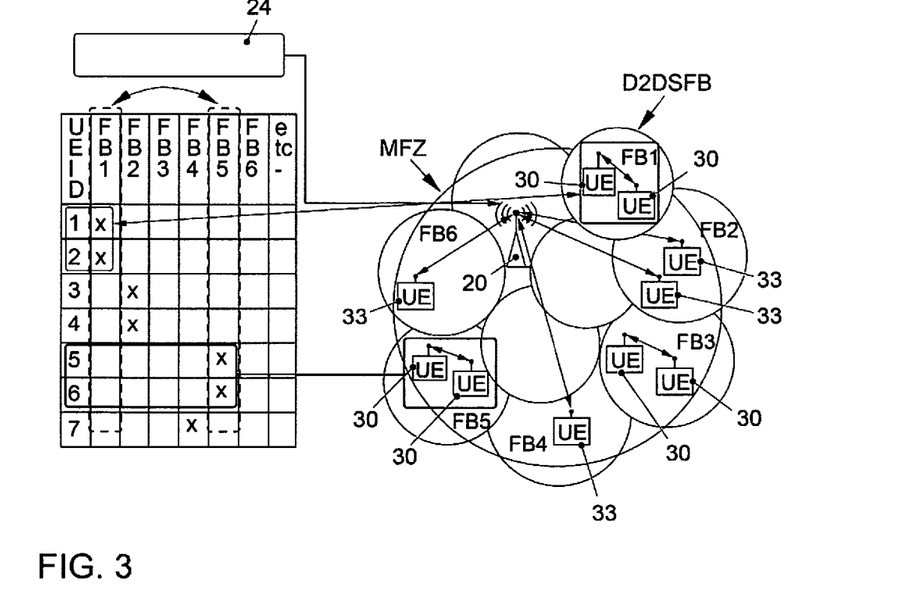
FIG. 3 shows an example of the management of the radio resources based on D2D subradio areas.

FIG. 3 shows the management of the radio resources when the frequency reuse technology is used. For this purpose, various D2D subradio areas FB1, FB3 and FB5 are defined. In this example, the scheduler 24 has the possibility of leaving the same radio resources to the D2D communication between UE1 and UE2 in the subradio area FB1 and to the D2D communication between UE5 and UE6 in the subradio area FB5. The respective UE designation is found in the table on the left-hand side in FIG. 3.

The size and the positions of these subradio areas depends on various parameters such as, among others, the amount of building development in the cell but also on the antenna parameters (radiation pattern, number of antennas of the potential interferer and also of the potential victim) and the transmission parameters (particularly transmitting power and frequency). Additionally, the scheduler 24 has to estimate the resource block expenditure for the D2D connections to reserve the resource blocks needed for these connections compared with potential victims in the vicinity.

Tasks developing from this are:
Identification of subradio areas: initial measurement, simulation (tools such as WinProp-ProMan by the company AWE), measurement in running operation by the base station, subscriber, IoT, estimate of the resource block expenditure depending on the service
Locating and mapping of the communication subscribers: this is done by measurement or estimate or forwarding of the position by the subscribers themselves (also the potential victims)
Application of the knowledge: the scheduler uses additional information such as the GPS position conveyed, transmitting power, type of antenna.

A potential victim in this context would be a subscriber station in which the quality of reception becomes poorer because of the D2D communication between two subscribers.

Figure 4:
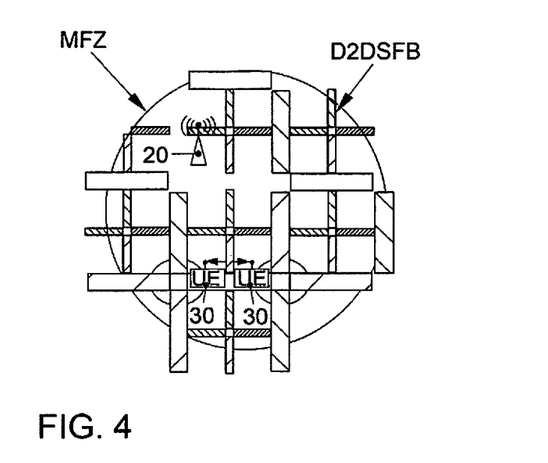
FIG. 4 shows a diagrammatic representation of a sub-D2D radio area definition for an assumed course of the road.

In FIG. 4 it is shown how a D2D subradio area definition based on the condition of roads and building development in the cell could be performed, e.g., with the aid of map data. In addition, measurement intervals could lead to a refinement of the area definition. In FIG. 4, various road sections are identified. In the case of urban development, it is assumed that such road sections are shielded, e.g., by rows of houses, so well from one another that they correspond to individual subradio areas SFB. It is only at points of intersection that other measures would have to take effect. Two such points of intersection are indicated by the circles in FIG. 4.

Another example of how D2D subradio areas can be determined is the D2D subradio area identification by a specific measuring interval. One possibility of estimating the interference characteristic in running operation is offered by the application of special measuring intervals (or special discovery procedures). For this purpose, the subscriber stations 30, 33 in the cell MFZ have to be identified which can be disturbed by the utilization of D2D communication. To these, a special measure interval is allocated in which the potential interferers send an uplink signal. This uplink signal corresponds either to a special reference signal or to a normal data communication with the base station 20. The interference power measured during this process is transmitted to the base station 20. This message can be classified according to particular specifications. This information can then be used by the scheduler 24 for defining the D2D subradio areas.

These measuring intervals could also include emissions from Internet of Things (IoT) devices or relay stations for identifying these radio areas.

Figure 5:
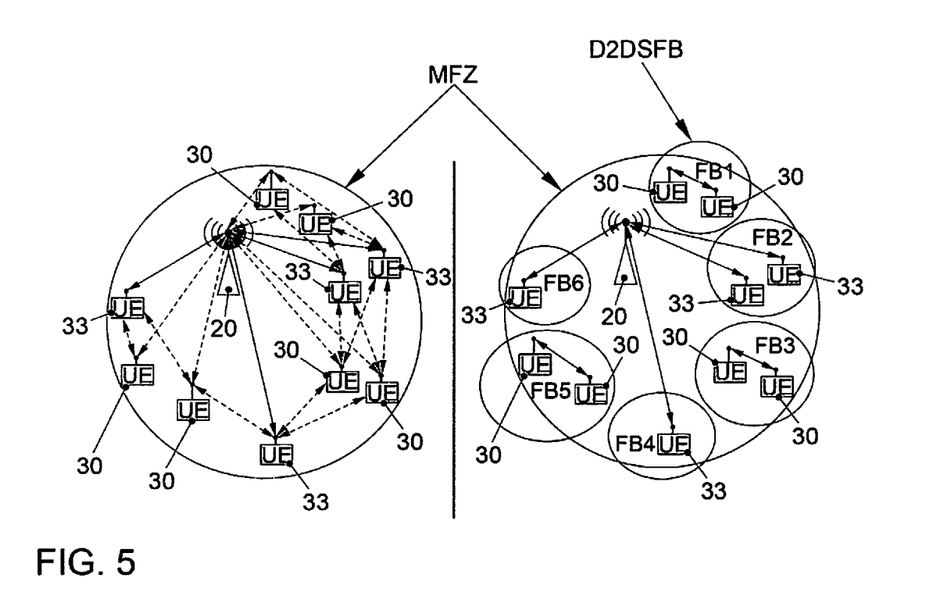
FIG. 5 shows a simplified representation of the interference estimation for definition of undisturbed subradio areas.

FIG. 5 shows a simplified representation of the interference estimation for the definition of undisturbed subradio areas. On the left: during the measuring interval, the interference power and possibly other characteristics of the interference are measured (interference dependent on the resource block, interference dependent on the angle of incidence, etc.). For this purpose, the potential interferers send a signal and the potential victims of interference measure the incoming signals. The connections in which such measurements take place are indicated by dashed lines in FIG. 5. On the right: based on the measurements and the knowledge about the subscriber stations (e.g., position, antenna characteristics, service requirements), the base station 20 defines the subradio areas FB1 to FB6 and allocates the subscriber stations 30, 33 to the subradio areas defined. For the efficient parallel operation based on the frequency reuse technology, the D2D subradio areas FB1, FB3 and FB5 are defined.

A further possibility of defining or identifying the D2D subradio areas consists in considering the distribution of power of the radiated signal. Depending on the position (or distance from potential interferers), of the transmitting power set and the QoS setting needed, the scheduler 24 can find pairs of communication which are allowed to use the same radio resources for a radio service in parallel in the same cell, without mutually interfering with one another or without dropping below the minimum requirements for quality demanded for their service. For this purpose, a minimum SINR value is frequently defined in the area of wireless communication which must not be undercut. SINR here stands for "Signal-to-Interference-plus-Noise-Ratio".

Figure 6:
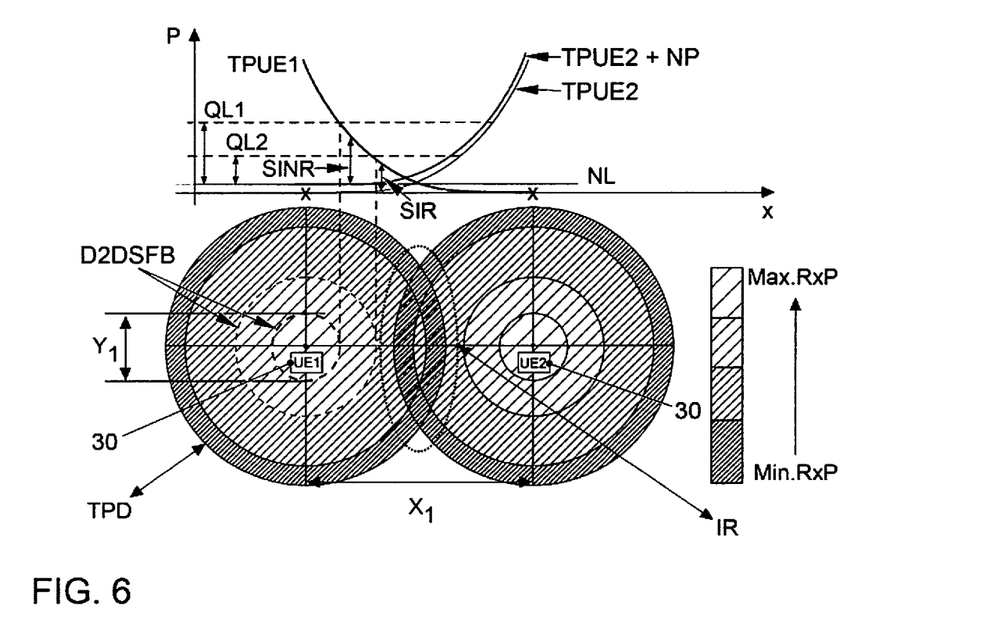
FIG. 6 shows a diagram for the definition of the D2D subareas by signal power distribution.

FIG. 6 illustrates this possibility. It shows the definition of the D2D subradio areas D2D SFB by the curves for the signal power distribution (or the path loss). The measurement curves TPUE1, TPUE2 shown in the upper part show the assumed power distribution P depending on the distance x between both subscriber stations UE1 and UE2 including the noise level. The noise level NL is drawn in. The measuring curve TPUE2+NP also shown, which specifies transmission power multiplied by the noise power is shifted upward in parallel by the value of the noise level NL. The two values QL1 and QL2 for two different quality requirements for the communication are also plotted. The values QL1 and QL2 correspond to predetermined SINR values which is also indicated in FIG. 6. The value QL1 corresponds to a very strict quality requirement for the definition of a D2D subradio area D2DSFB. The value QL2 corresponds to a moderate quality requirement. The associated D2D subradio areas D2DSFB are indicated with dashed lines around the subscriber station UE1. The quality requirement QL2 belongs to the larger circle, QL1 correspondingly to the smaller circle. The lower part of FIG. 6 thus shows in other words the definition of the size and the shape of the "undisturbed D2D subradio area" for UE1 by the predetermined SIR or SINR value. SIR here stands for "Signal-to-Interference-Ratio". The undisturbed radio area is influenced by the distance x from a potential interferer, in FIG. 6 the subscriber station UE2, and the radiated transmitting power P of the interferer. Additionally, the size of the D2D subradio area D2DSFB is determined depending on the quality level QL1, QL2 needed for the service used.

A further possibility for defining the D2D subradio areas D2DSFB is to measure the power distribution of the signal radiated by using the beam forming technology. This leads to an improved utilization of the radio resources in the space since the radiated power rises mainly in the desired area or, respectively, the interference can be minimized or prevented in the other areas.

To efficiently render this gain to be useful and at the same time avoid unwanted interference by the beam forming, the scheduler 24 should obtain, apart from the position of the station, additional information on the antenna characteristics (beam width and angular adjustment possibilities) but also the orientation of the antennas. To reduce the communication expenditure for the transmission of such information, look-up tables should be used for the beam alignment. It is then not necessary to transmit the complete adjustment values and is sufficient if the index values are transmitted. One possibility also exists in that the subscriber station combines the values for the orientation and the reference alignment and specifies only the direction in which it would like to/should transmit.

Figure 7:
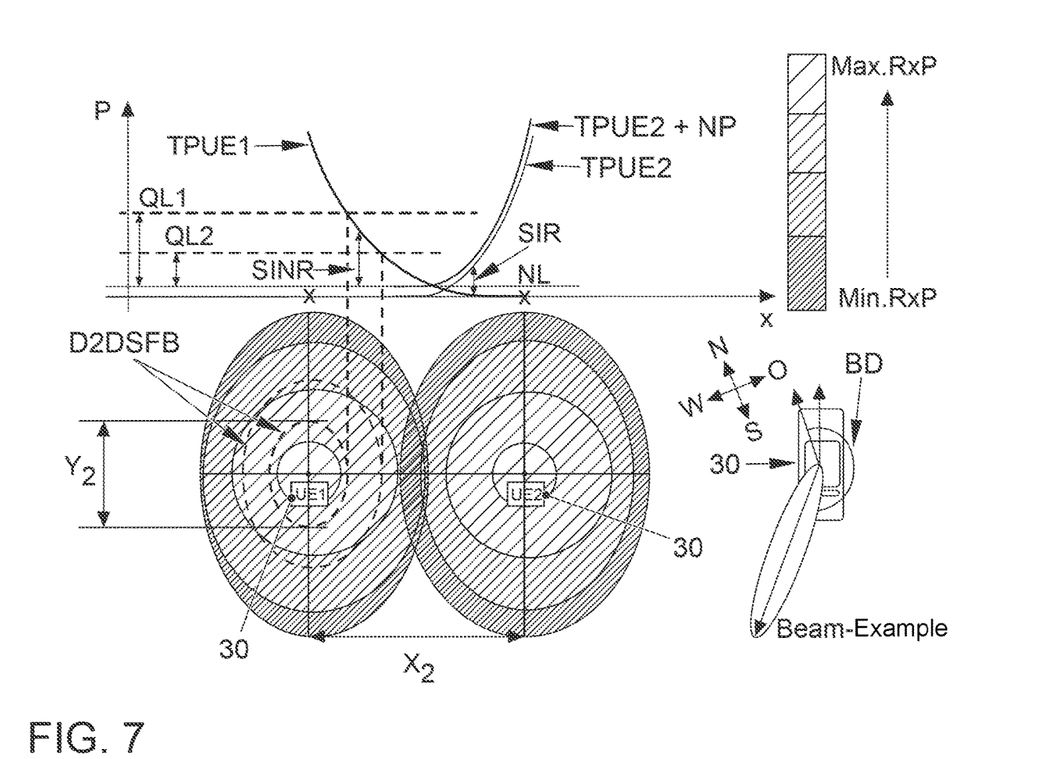
FIG. 7 shows a representation of the influence of the antenna characteristics (radiation pattern like, e.g., with smart antenna systems) on the dimensions of the radio area.

FIG. 7 shows a representation of the influence of the antenna characteristics (radiation pattern like, e.g., in the case of "smart-antenna" systems) on the shape and dimensions of the radio area around a subscriber station. By using the beam forming technology, the shape of the D2D subradio area D2DSFB changes depending on the antenna settings and the orientation of the station 30 in space. The angle for the beam alignment BD is also shown in FIG. 7. For a definition of the D2D subradio areas D2DSFB, this information is also transmitted to the scheduler 24 in this instance.

It should be understood that the proposed method and the associated devices can be implemented in various forms of hardware, software, firmware, special processors or a combination of these. Special processors can comprise application-specific integrated circuits (ASICs), Reduced Instruction Set Computers (RISC) and/or Field Programmable Gate Arrays (FPGAs). Optionally, the proposed method and the device are implemented as a combination of hardware and software. The software may be installed as an application program on a program storage device. This is typically a machine based on a computer platform which has hardware such as, for example, one or more central processing units (CPU), a random access memory (RAM) and one or more input/output (I/O) interface(s). On the computer platform, an operating system is typically also installed. The various processes and functions which have been described here can be a part of the application program or a part which is executed via the operating system.

The disclosure is not restricted to the illustrative embodiments described here. There is scope for various adaptations and modifications which would be considered by the expert due to his technical knowledge as also belonging to the disclosure.

List of reference designations

| | |
|---|---|
| 10 | Internet |
| 20 | base station |
| 24 | mobile radio network management unit |
| 30 | subscriber station for D2D communication |
| 31 | radio communication module |
| 33 | subscriber station for other mobile communication |
| 40 | Evolved Packet Core EPC |
| MFZ | mobile radio cell |
| B2UE | communication between base and subscriber |
| D2Da | direct communication a |
| D2Db | direct communication b |
| D2Dc | direct communication c |
| UL | transmission in the uplink direction |
| DL | transmission in the downlink direction |
| UE | subscriber station (user equipment) |
| D2DSFB | subradio area for direct communication |
| FB1 | radio area 1 |
| FB2 | radio area 2 |
| FB3 | radio area 3 |
| FB4 | radio area 4 |
| FB5 | radio area 5 |
| FB6 | radio area 6 |
| TPUE1 | transmitting power UE1 |
| TPUE2 | transmitting power UE2 |
| TPUE2 + NP | transmitting power UE2 with noise power |
| QL1 | quality requirement 1 |
| QL2 | quality requirement 2 |
| SINR | signal-to-interference plus noise ratio |
| SIR | signal-to-interference ratio |
| NL | noise level |
| TPD | transmitting power distribution in free space |
| IR | interference area |
| BD | beam alignment |

The invention claimed is:

1. A method for organizing communication between mobile radio network subscriber stations in a mobile radio cell, the method comprising:
performing allocation of radio resources by a mobile radio network management unit in the mobile radio cell by:
measuring characteristics of interference by obtaining a signal from potential mobile radio network subscriber station interferers;
defining by the mobile radio network management unit subradio areas based on the measured characteristics;
allowing mobile radio subscriber stations within a defined subradio area to use the same radio resources for direct communication with one another in parallel operation; and
utilizing map data to correlate the subradio areas to shielded geographic areas.

2. The method of claim 1, the geographic areas correspond to individual street routes.

3. The method of claim 1 further comprising determining subradio areas based on the subscriber stations disturbed by the parallel operation of subscriber stations which perform the direct communication.

4. The method of claim 3 further comprising determining conditions at the disturbed subscriber stations by allocating a measurement interval during which measurements performed by the disturbed subscriber stations and a corresponding uplink test signal from subscriber stations which are tested for the parallel operation are sent out to the mobile radio network management unit.

5. The method of claim 3, wherein the measurements relate to measurements of the received signal strength or the interference power of the uplink test signal.

6. The method of claim 3, further comprising conveying to a base station by a subscriber station that is planning a direct communication information with respect to the direct communication.

7. The method of claim 6 wherein the information about the radio characteristics of interference correspond to position of, transmitting power of, antenna type and/or the operation used by the potential mobile radio network subscriber station interferers.

8. The method of claim 1, wherein the direct communication between two subscribers corresponds to a direct vehicle communication between at least two vehicles or to a communication between a vehicle and an infrastructure component.

9. The method of claim 8, wherein an antenna technology with beam alignment possibility is used for the direct vehicle communication, the method further comprising receiving by the base station information with respect to a setting of the beam alignment to the base station from the vehicles which perform the direct vehicle communication.

10. The method of claim 9, further comprising using lookup tables are for the information with respect to the setting of the beam alignment and during the transmission of the information with respect to the setting of the beam alignment, and transmitting an index value for the corresponding entry in the lookup table.

11. A mobile radio network subscriber station for use in a method for organizing communication between mobile radio network subscriber stations in a mobile radio cell, comprising:
a mobile radio network management unit in the mobile radio cell configured to perform allocation of radio resources by:
measuring characteristics of interference by obtaining a signal from potential mobile radio network subscriber station interferers;
defining by the mobile radio network management unit subradio areas based on the measurement characteristics;
utilizing map data to correlate the subradio areas to shielded geographic areas;
allowing mobile radio subscriber stations within a defined subradio area to use the same radio resources for direct communication with one another in parallel operation;
determining subradio areas based on the subscriber stations disturbed by the parallel operation of subscriber stations which perform the direct communication; and determining conditions at the disturbed subscriber stations by allocating a measurement interval during which measurements performed by the disturbed subscriber stations and a corresponding uplink test signal from subscriber stations which are tested for the parallel operation are sent out to the mobile radio network management unit.

12. The mobile radio network subscriber station of claim 11 further comprising:
a radio communication module, the radio communication module being an equipment component of a vehicle, wherein the vehicle is equipped for the direct vehicle communication with an antenna technology with beam alignment possibility; and
wherein the radio communication module is configured to convey the information with respect to setting of the beam alignment to a base station.

13. The mobile radio network management unit of claim 12, wherein the mobile radio network management unit is configured to receive information with respect to the setting of the beam alignment from a vehicle equipped for direct vehicle communication with an antenna technology having beam alignment possibility and specify the subradio areas based on the beam alignment setting information.

* * * * *